Figure 1:
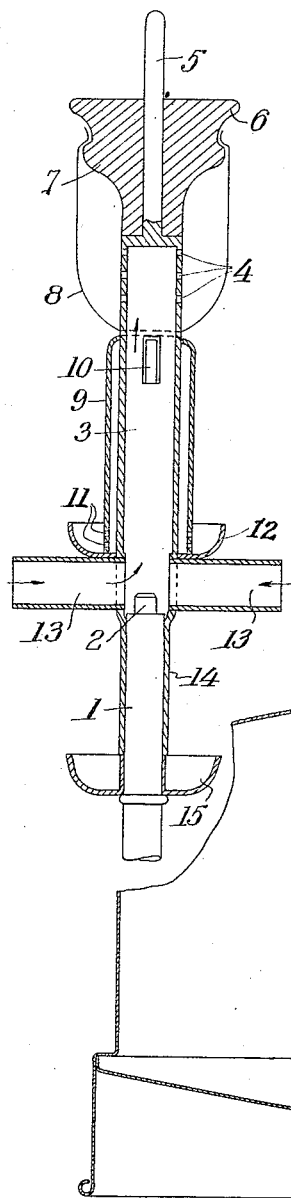

June 27, 1933.  P. LUCAS  1,915,502
BURNER FOR LIQUID FUEL
Filed Aug. 31, 1931

Paul Lucas
INVENTOR

By: Marks & Clerk
Attys.

Patented June 27, 1933

1,915,502

UNITED STATES PATENT OFFICE

PAUL LUCAS, OF BERLIN-FRIEDENAU, GERMANY

BURNER FOR LIQUID FUEL

Application filed August 31, 1931, Serial No. 560,417, and in Germany September 11, 1930.

The present invention relates to burners for liquid fuel and particularly to burners for petroleum which are equipped with inverted incandescent mantles.

Lamps for liquid fuel, such as for instance petroleum, are known in which the mixing tube and the vaporizing tube are extended through the inverted incandescent mantle and the vaporizing tube is heated by the heat from the flame gases in the incandescent mantle being transferred back through the heat-conducting walls of the mixing tube and the vaporizing tube. To lamps of this kind many drawbacks exist. When the mixing tube is arranged within the incandescent mantle the hot gas ascending from the gas nozzle must be deflected downwardly and be forced to flow downwardly over a relatively long path. Also when the gas nozzle is arranged above the incandescent mantle and the vaporizing tube is heated directly by the flame gases similar difficulties will arise. The chief drawbacks of this prior lamp system may be summarized as follows:

1. On account of the direction of flow of the gas-air mixture being changed energy will be lost, that is, the amount of air primarily sucked into the apparatus will be smaller than that which would have been drawn in at the same gas pressure if the direction of flow had not been changed.

2. The outlet openings in the burner are situated above the flame and the portion surrounding these openings are therefore intensively heated and brought to glow. Moreover, the gas-air mixture is subjected to a very high temperature when leaving the burner and is thereby highly expanded, whereby the contents of the air of the primary mixture is further reduced.

On account of the above given facts the burner head must be made of carborundum or a similar material and therefore becomes relatively heavy. The production of the burner head is expensive, since it is difficult to produce the outlet apertures for the fuel mixture.

The chief object of the present invention is to provide a burner in which the above named drawbacks are eliminated. According to the invention the gaseous fuel mixture escaping from the mixing tube is fed directly in the form of a current to the inverted incandescent mantle and the heating of this mantle is performed in the same manner as the heating of an upright incandescent mantle, whereby a partial current of the fuel mixture is deflected downwardly and utilized for feeding an auxiliary flame by means of which the vaporizing tube is directly or indirectly heated. The fuel mixture is introduced laterally into the incandescent mantle through a plurality of perforations arranged in the upper end portion of the mixing tube.

The burner according to the present invention possesses many advantages over lamp burners with incandescent mantles of the kind hitherto used. The novel burner is of extraordinarily simple construction and can be manufactured at low costs. It is not necessary to deflect the flow of gas-air mixture which is conducted to the inverted incandescent mantle and the primary mixture is therefore rich in air. The essential part of the flame gases is directed upwardly and the fuel is therefore vaporized by means of an auxiliary flame which is produced below the incandescent mantle at a point lying relatively near the same. The incandescent mantle is not damaged by the combustion gases of the auxiliary flame, since the primary mixture is rich in air and the addition of secondary air is more or less superfluous.

The part of the mixing tube in which the outlet openings for the gasified fuel are arranged is cooled by the current of gas mixture, whereby a primary mixture is obtained which is relatively rich in air.

A direct heating of the burner by the flame gases in and around the incandescent mantle is prevented by means of a body of refractory material, for instance magnesia, which simultaneously serves as a carrier for the incandescent body and makes it possible to remove the incandescent mantle by means of a simple manipulation.

A constructional form of the invention is shown schematically in the accompanying drawing in which Fig. 1 is a longitudinal sectional view of a burner according to the invention.

Figure 2:
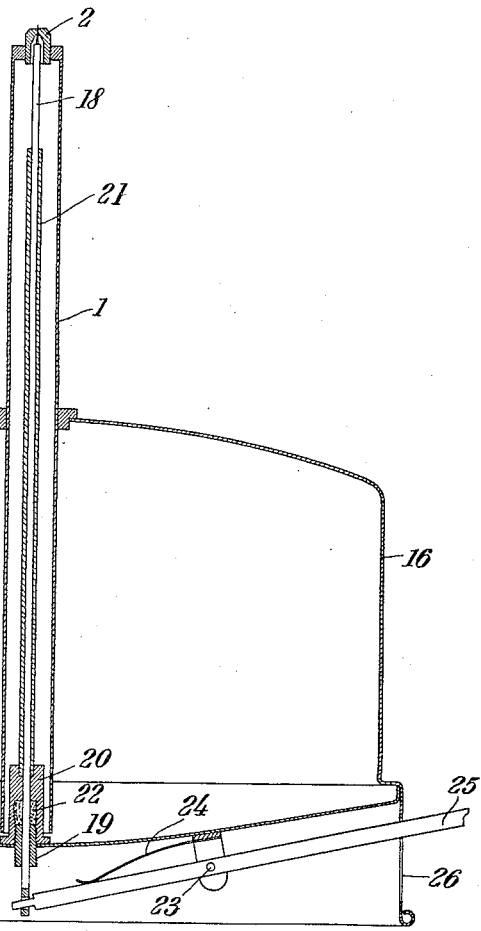

Fig. 2 shows a device by means of which the burner nozzle is cleaned.

The fuel, for instance petroleum, is stored in a reservoir and is forced into the vaporizer tube 1 by air pressure. The necessary air pressure may for instance be created by means of a pump or the like. The fuel forced into the tube 1 enters the mixing tube 3 through the nozzle 2 and flows into the interior of the incandescent mantle 8 through series of perforations 4 arranged in the upper part of the mixing tube 3. The upper end of this tube is closed by a plate to which a pin 5 is fixed. On this pin, in sliding engagement with same, a body 6 of refractory material, for instance magnesia or the like, is arranged. This body which carries the inverted incandescent mantle of the lamp, is formed with deflecting faces 7, which from the bottom part of the body are directed upwards and outwards and by means of which the flame gases are deflected laterally and forced against the sides of the incandescent mantle 8. The lower opening of the mantle 8 surrounds the tube 3. The lower part of the mixing tube 3 is surrounded by a tubular body 9 and the annular chamber formed between the tubes 9 and 3 communicates with the interior of the tube 3 through an opening 10 in the latter. The upper end of the tubular body 9 terminates adjacent the lower end of the mantle 8. A portion of the ascending gas-air mixture is deflected through the opening 10 into the intermediate space between the tubes 3 and 9 and escapes through apertures 11 arranged in the lowermost part of the tube 9. This gas current feeds an auxiliary flame and heats a heating cup 12 arranged above the nozzle 2 and above tube 13, through which primary air is fed to the tube 3. As will be seen from Fig. 1 of the drawing the tubes 13 are arranged transversely to the longitudinal axis of the burner system. Below the cup 12 the mixing tube 3 is formed with a prolongation 14, which is adapted to be pushed over the vaporizer tube 1 and in operative position rests on the lighting or preheating cup 15. Adjacent the tubes 13 the member 14 is provided with apertures through which the primary air is admitted. The mixing tube 3 is made from a heat-conducting material. This tube, especially that part of same which lies below the cup 11 is dimensioned in such a manner, that the heat from the auxiliary flame and the cup 11 is easily transmitted to the vaporizer tube 1. As will be seen from the drawing the path over which the heat will have to be transmitted is extremely short. The heat applied to the tube 1 will effect a vaporization of the fuel contained in the same and the vaporized fuel will be forced through the nozzle 2 into the mixing tube 3 in which it is mixed with the primary air. Through the tube 3 and the perforations 4 this gas passes into the interior of the incandescent mantle 8. On account of the deflecting faces 7 and the manner in which the perforations 4 are arranged the flame gases will flow partially in a lateral and partially in an upward direction.

If desired the nozzle 2 and the cross-tubes 13 may be arranged above the apertures 11 and the heating cup 12.

Fig. 2 shows a device by means of which the nozzle 2 may be cleaned.

The vaporizer tube 1 is connected to the container 16 by means of a threaded connection. The lower end of the tube 1 terminates adjacent the bottom of the container and in the upper end of this tube the nozzle 2 is seated. The bore of the nozzle is adapted to receive the upper short part of the cleaning needle 18 and slides loosely in the members 19 and 20 of a suitable stuffing box arrangement. The member 20 is soldered or welded to the bottom 17 of the container 16. Between the members 19 and 20 a packing mass 22 is arranged, which for instance may consist of graphite flakes. In order to reduce the friction in the packing the needle 18 is made as thin as possible. A guide tube 21 for the needle 18 is soldered to the member 20. On account of this tube the liquid fuel has no access to the bore of the stuffing box when the burner is not in use. Also when the burner is in use the tube 21 will prevent a liquid fuel from reaching the stuffing box provided that the tube is of sufficient height. This tube is an important feature of the invention since it under all circumstances ensures a complete tightness of the stuffing box. The cleaning needle 18 can be operated by means of any convenient device, for instance by means of the mechanism shown in Fig. 2. As will be seen, the needle 18 is connected to a double lever 25, which is pivotally arranged at 23 and the inner arm of which is normally pressed downwardly by a spring 24. The other arm of the lever projects through an opening 26 in the base part of the container and a light pressure on this arm is sufficient to clean the nozzle thoroughly, so that the flame is maintained.

In comparison with cleaning devices of known kind the cleaning device according to the invention possesses many advantages. All parts of same can be easily removed. The cleaning needle can be removed simply by detaching it from the lever 25. The needle is protected from the liquid fuel by the tube 21 which terminates above the fluid level. The device is thus fully fluid tight and on account of the packing 22 in the stuffing box member 20 it is also gas tight.

The details of construction may be modified.

Having now particularly described and ascertained the nature of this invention and in what manner the same is to be performed. What is claimed is:—

1. In a burner for liquid fuel, a mixing tube, a vaporizer device inserted in the lower part of said mixing tube and arranged in heat-conductive relation thereto, an inverted incandescent mantle surrounding the upper apertured part of said mixing tube, supply conduits through which primary air is fed to said mixing tube, means for forcing a current of gaseous fuel mixture directly upward through the mixing tube and into the inverted incandescent mantle, a pin on the upper closed end of the mixing tube, a carrier body for the inverted incandescent body arranged on said pin in sliding engagement therewith, deflecting means on said carrier body for directing the flame gases outward and upward through the incandescent mantle and means for heating said vaporizer device.

2. In a burner for liquid fuel, a mixing tube closed at its top and having apertures in its sides, a vaporizer device inserted in the lower part of said mixing tube and arranged in heat-conductive relation thereto, an inverted incandescent mantle attached on its top and surrounding the mixing tube and supplied through said apertures in the side of the mixing tube with a fuel and air mixture, supply conduits through which primary air is fed to said mixing tube, means for forcing a current of gaseous fuel mixture directly upward through the mixing tube and through the apertures on the side thereof in its upper part into the inverted incandescent mantle and other means for heating said vaporizer device.

3. In a burner for liquid fuel, a mixing tube closed at its top and having apertures in its sides, a vaporizer device inserted in the lower part of said mixing tube and arranged in heat-conductive relation thereto, an inverted incandescent mantle attached on its top and surrounding the mixing tube and supplied through said apertures on the sides of the mixing tube with a fuel and air mixture, supply conduits through which primary air is fed to said mixing tube, means for forcing a current of gaseous fuel mixture directly upward through the mixing tube and through the apertures in the sides thereof in its upper part into the inverted incandescent mantle, a heating device for heating said vaporizer, a cylindrical member surrounding part of said mixing tube in spaced relation to same and means for deflecting part of the ascending gaseous fuel mixture downward through the intermediate space between said cylindrical member and said mixing tube into the heating device for the vaporizer.

4. In a burner for liquid fuel, a mixing tube closed at its top and having apertures on its sides, a vaporizer device inserted in the lower part of said mixing tube and arranged in heat-conductive relation to same, an inverted incandescent mantle attached on its top and surrounding the mixing tube in the upper part thereof and being supplied through said apertures in the sides of the mixing tube with a fuel and air mixture, a pin on the upper closed end of the mixing tube, a carrier body for the inverted incandescent mantle arranged on said pin in sliding engagement with same, the top of the inverted mantle being fixed on the carrier body, and means for heating said vaporizer device.

5. In a burner for liquid fuel, a mixing tube closed at its top and having apertures in its sides, a vaporizer device inserted in the lower part of said mixing tube and arranged in heat-conductive relation thereto, an inverted incandescent mantle attached on its top and surrounding the mixing tube and supplied through said apertures in the sides of the mixing tube with a fuel and air mixture, supply conduits through which primary air is fed to said mixing tube, means for forcing a current of gaseous fuel mixture directly upward through the mixing tube and through the apertures in the sides thereof into the incandescent mantle, and a heating device for the vaporizer device on the outside of said mixing tube, the material of the mixing tube in the part of the same lying between the heating device and the vaporizer device being heat-conductive and of such thickness, that the heat from the former is transmitted substantially without loss to the latter.

6. In a burner for liquid fuel, in combination a container for fluid fuel, a vaporizer device communicating with said container, a fuel nozzle on said vaporizer device, a mixing tube at its top and having apertures in its sides, a vaporizer device inserted in the lower part of said mixing tube and arranged in heat-conductive relation thereto, an inverted incandescent mantle attached on its top and surrounding with its lower end the mixing tube and supplied through said apertures in the sides of the mixing tube with a fuel and air mixture, means for forcing a current of vaporized fuel and air mixture directly upward through the mixing tube and its apertures on its sides into said inverted incandescent mantle and forcing a part of said fuel and air mixture downwardly for producing an auxiliary flame for heating the vaporizer device, and an additional heating device for initiating the heating of the vaporizer device.

7. In a burner for liquid fuel, a container containing the liquid fuel, a mixing tube closed at its top and having apertures in its sides, a vaporizer device inserted in the lower part of said mixing tube and arranged in heat-conductive relation thereto, an inverted incandescent mantle attached on its top and surrounding the mixing tube and supplied through said apertures in the sides of the mixing tube with a fuel and air mixture, a nozzle on said vaporizer device, a cleaning device for cleaning said nozzle secured on the bottom of said container for containing the liquid fuel, and comprising a cleaning needle for said nozzle, a sleeve, connected with the bottom of the container in a fluid and gas-tight manner and connected in the same manner with a tube for guiding said cleaning needle, and projecting above the fluid level in said container, and a lever for reciprocating a carrier rod of the cleaning needle, pivotally arranged outside of and beneath the bottom of the container, being detachably connected to said rod and to the bottom of the container and operable manually from the outside of same.

PAUL LUCAS.